(12) United States Patent
Harp et al.

(10) Patent No.: US 9,191,624 B2
(45) Date of Patent: Nov. 17, 2015

(54) SYSTEM AND METHOD TO DETERMINE AN AUTHORIZATION OF A WIRELESS SET-TOP BOX DEVICE TO RECEIVE MEDIA CONTENT

(75) Inventors: David Harp, Plano, TX (US); Jason Godfrey, Volcano, CA (US); Sanjay Macwan, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 523 days.

(21) Appl. No.: 12/547,614

(22) Filed: Aug. 26, 2009

(65) Prior Publication Data

US 2011/0055862 A1    Mar. 3, 2011

(51) Int. Cl.
| | | |
|---|---|---|
| *H04N 7/173* | (2011.01) | |
| *H04N 21/258* | (2011.01) | |
| *H04N 21/422* | (2011.01) | |
| *H04N 21/436* | (2011.01) | |
| *H04N 21/45* | (2011.01) | |
| *H04N 21/488* | (2011.01) | |
| *H04N 21/6334* | (2011.01) | |
| *H04N 21/658* | (2011.01) | |

(52) U.S. Cl.
CPC ...... *H04N 7/17318* (2013.01); *H04N 21/25841* (2013.01); *H04N 21/42202* (2013.01); *H04N 21/43615* (2013.01); *H04N 21/4524* (2013.01); *H04N 21/4882* (2013.01); *H04N 21/63345* (2013.01); *H04N 21/6582* (2013.01)

(58) Field of Classification Search
CPC .......... H04N 21/4405; H04N 21/4524; H04N 7/1675; H04N 21/4627; H04N 21/2347; H04N 21/26606; H04N 21/26613; H04N 21/4181; H04N 21/43615; H04N 21/42202; H04N 21/25841; H04N 7/17318
USPC ............... 725/86, 87, 91, 93, 94, 98, 68, 100, 725/131, 151, 80–85, 25–30
See application file for complete search history.

(56) References Cited

U.S. PATENT DOCUMENTS

| | | | | |
|---|---|---|---|---|
| 6,009,116 | A * | 12/1999 | Bednarek et al. ............. | 375/130 |
| 7,450,930 | B2 * | 11/2008 | Williams et al. .............. | 455/411 |
| 8,185,927 | B2 * | 5/2012 | Karaoguz et al. ............. | 725/105 |
| 8,196,169 | B1 * | 6/2012 | Herz ............................... | 725/48 |
| 2001/0011008 | A1 | 8/2001 | Perry et al. | |
| 2002/0154777 | A1 * | 10/2002 | Candelore ..................... | 380/258 |
| 2005/0055729 | A1 * | 3/2005 | Atad et al. .................... | 725/118 |
| 2006/0209745 | A1 * | 9/2006 | MacMullan et al. .......... | 370/328 |
| 2006/0271949 | A1 | 11/2006 | Perry et al. | |
| 2007/0022459 | A1 * | 1/2007 | Gaebel et al. ................. | 725/114 |
| 2008/0025245 | A1 | 1/2008 | Sweeney et al. | |
| 2008/0136969 | A1 * | 6/2008 | Chang et al. .................. | 348/557 |
| 2008/0313691 | A1 * | 12/2008 | Cholas et al. ................. | 725/131 |
| 2009/0136081 | A1 | 5/2009 | Mamidwar et al. | |
| 2010/0287582 | A1 * | 11/2010 | Barnett, Jr. .................... | 725/25 |
| 2010/0319021 | A1 * | 12/2010 | Emerson et al. ............... | 725/33 |

* cited by examiner

*Primary Examiner* — Pankaj Kumar
*Assistant Examiner* — Alazar Tilahun
(74) *Attorney, Agent, or Firm* — Toler Law Group, PC

(57) ABSTRACT

A computer-implemented method includes determining, at a set-top box device, positioning data associated with a location of the set-top box device. The computer-implemented method includes determining whether the set-top box device is authorized to receive media content at the location. The computer-implemented method also includes receiving the media content via a wireless transmission from a residential gateway when the set-top box device is authorized to receive the media content at the location.

19 Claims, 7 Drawing Sheets

SYSTEM AND METHOD TO DETERMINE AN AUTHORIZATION OF A WIRELESS SET-TOP BOX DEVICE TO RECEIVE MEDIA CONTENT

FIELD OF THE DISCLOSURE

The present disclosure is generally related to determining an authorization of a wireless set-top box device to receive media content.

BACKGROUND

Emerging wireless transmission technologies may enable a residential gateway to wirelessly transmit media content, such as video content, to a set-top box device. By doing so, the set-top box device may receive media content without the set-top box device being coupled to the residential gateway via a cable. However, when a residential gateway is used to wirelessly transmit media content to a set-top box device, an unauthorized set-top box device that is within a broadcast range of the residential gateway may receive the wirelessly transmitted media content.

DETAILED DESCRIPTION

In a particular embodiment, a computer-implemented method includes determining, at a set-top box device, positioning data associated with a location of the set-top box device. The computer-implemented method includes determining whether the set-top box device is authorized to receive media content at the location. The computer-implemented method also includes receiving the media content via a wireless transmission from a residential gateway when the set-top box device is authorized to receive the media content at the location.

In another particular embodiment, a residential gateway includes a receiver to receive a device identifier of a set-top box device and to receive positioning data from the set-top box device having a Global Positioning System (GPS) receiver. The positioning data identifies a location of the set-top box device. The residential gateway also includes an authorization module to determine whether the set-top box device is authorized to receive media content from the residential gateway based on the device identifier and based on the location. The residential gateway further includes a transmitter to transmit the media content wirelessly to the set-top box device when the authorization module determines that the set-top box device is authorized to receive the media content.

In another particular embodiment, an authorization server includes a processor and a computer-readable storage medium including operational instructions that, when executed by the processor, cause the authorization server to receive positioning data from a residential gateway. The positioning data identifies a location of a set-top box device having a Global Positioning System (GPS) receiver. The computer-readable storage medium further includes operational instructions that, when executed by the processor, cause the authorization server to determine whether the set-top box device is authorized to access media content at the location. The computer-readable storage medium further includes operational instructions that, when executed by the processor, cause the authorization server to send a message to the residential gateway instructing the residential gateway to prevent transmission of the media content to the set-top box device when the set-top box device is not authorized to access the media content at the location.

Figure 1:
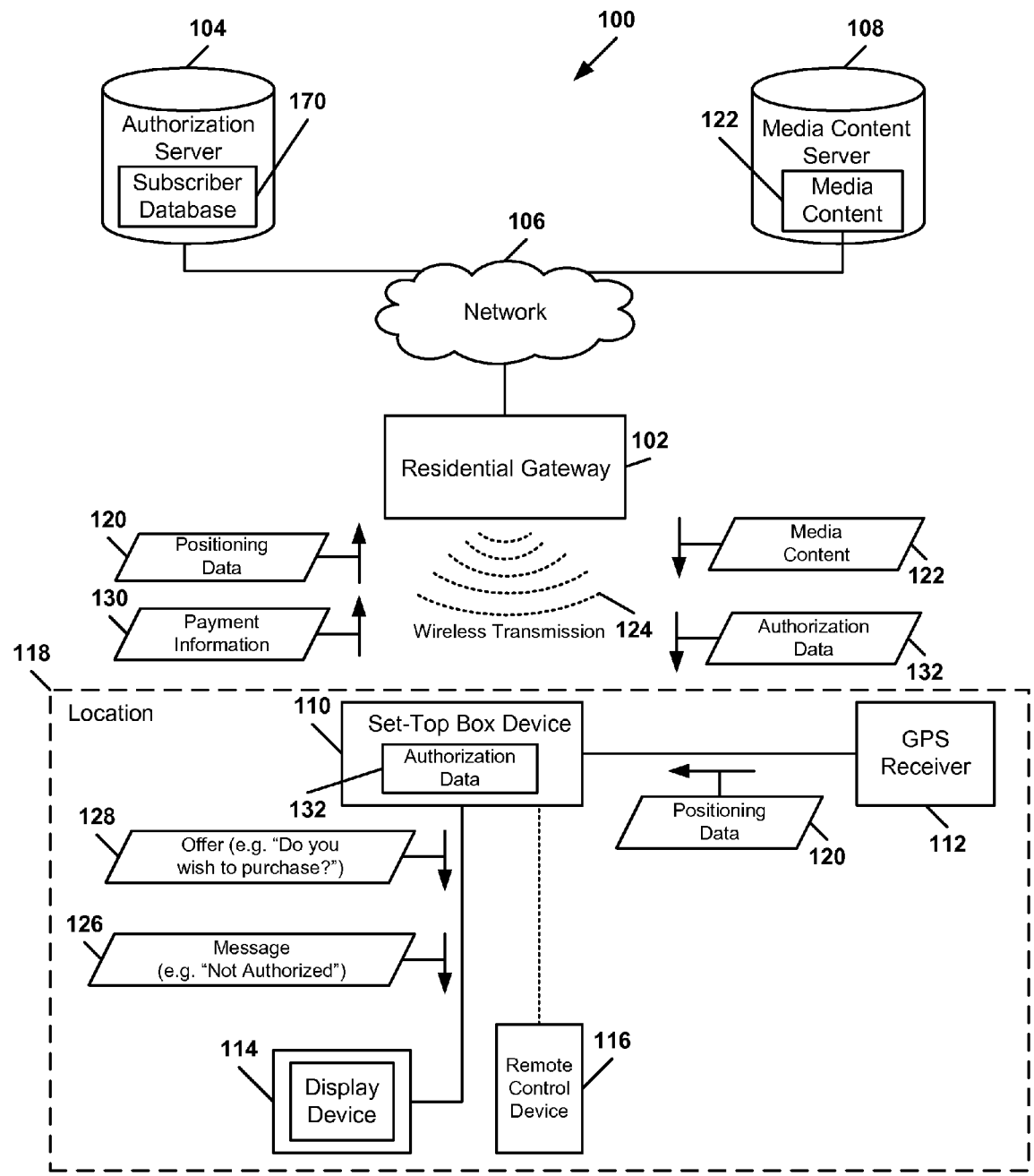
FIG. 1 is a block diagram of a first particular embodiment of a system to determine an authorization of a wireless set-top box device to receive media content.

Referring to FIG. 1, a block diagram of a first particular embodiment of a system to determine an authorization of a wireless set-top box device to receive media content is depicted and generally designated 100. The system 100 includes a residential gateway 102, an authorization server 104, and a media content server 108 coupled to a network 106. The residential gateway 102 may communicate with a set-top box device 110 via a wireless transmission 124.

The media content server 108 may store media content 122 and send the media content 122 to the residential gateway 102 via the network 106. The media content 122 may include audio content, video content, video-on-demand content, other media content, or any combination thereof. For example, the video content may include television program content, movie content, video-on-demand content, and pay-per-view content.

The residential gateway 102 may receive the media content 122 from the media content server 108 via the network 106. For example, the network 106 may be an Internet Protocol Television (IPTV) network that transports audio and video files from the media content server 108 to the residential gateway 102. The residential gateway 102 may transmit the media content 122 to the set-top box device 110 via the wireless transmission 124 when the set-top box device 110 is authorized to receive the media content 122 at a location 118 of the set-top box device 110. For example, the wireless transmission 124 may use a wireless protocol, such as an 802.11 wireless protocol, a High Definition Multimedia Interface (HDMI) wireless protocol, a High Definition (HD) wireless protocol, other wireless protocol, or any combination thereof.

The authorization server 104 may include a subscriber database 170 containing account information associated with subscribers to at least a portion of the media content 122. When the set-top box device 110 is not authorized to receive the media content 122 at the location 118, the authorization server 104 may receive payment information 130 from the set-top box device 110 via the residential gateway 102. In response to receiving the payment information 130, the authorization server 104 may update the subscriber database 170. The authorization server 104 may send authorization data 132 to the set-top box device 110 via the residential gateway 102 indicating that the set-top box device 110 is authorized to receive the media content 122 at the location 118. The set-top box device 110 may receive the authorization data 132 and store the authorization data 132 at the set-top box device 110. The authorization data 132 may identify particular portions of the media content that the set-top box device 110 may receive at the location 118. For example, the authorization data 132 may indicate whether the set-top box device 110 has a bronze-level subscription type, a silver-level subscription type, or a gold-level subscription type. The bronze-level subscription type may enable the set-top box device 110 to receive a set of basic media content, the silver-level subscription type may enable the set-top box device 110 to receive the set of basic channels and some premium media content, and the gold-level subscription type may enable the set-top box device 110 to receive the set of basic channels and all the premium media content.

The set-top box device 110 may receive the media content 122 from the residential gateway 102 via the wireless transmission 124 when the set-top box device 110 is authorized to receive the media content 122 at the location 118. The set-top box device 110 may send the received media content 122 to a display device 114 that is coupled to the set-top box device 110. A remote control device 116 may be used to wirelessly interact with the set-top box device 110. A Global Positioning System (GPS) receiver 112 is coupled to the set-top box device 110 to provide the positioning data 120 associated with the set-top box device 110. The positioning data 120 may enable the set-top box device 110 to determine whether the set-top box device 110 is authorized to receive the media content 122 at the location 118.

In operation, the set-top box device 110 may receive positioning data 120 associated with the location 118 of the set-top box device. The positioning data 120 may be received from the GPS receiver 112. In a particular embodiment, the GPS receiver 112 is integrated into the set-top box device 110. The set-top box device 110 may determine whether the set-top box device 110 is authorized to receive the media content 122 at the location 118. When the set-top box device 110 is authorized to receive the media content 122 at the location 118, the set-top box device 110 may receive the media content 122 via the wireless transmission 124. The set-top box device 110 may send the media content 122 to the display device 114 for display at the display device 114.

When the set-top box device 110 is not authorized to receive the media content 122 at the location 118, the set-top box device 110 may disable reception of the media content 122 at the set-top box device 110. In addition, the set-top box device 110 may display a message 126. The message 126 may indicate that the set-top box device 110 is not authorized to receive the media content 122 at the location 118 (e.g. "This device is not authorized to receive media content at this location."). The set-top box device 110 may send an offer 128 to the display device 114 when the set-top box device 110 is not authorized to receive the media content 122 at the location 118. The offer 128 may be an offer to purchase an authorization to access the media content 122 at the location 118. In response to displaying the offer 128 at the display device 114, the set-top box device 110 may send payment information 130 to the residential gateway 102 to purchase authorization to access the media content 122. The set-top box device 110 may receive the payment information 130 via the remote control device 116. The set-top box device 110 may receive the authorization data 132 from the residential gateway 102 after the set-top box device 110 sends the payment information 130 to the residential gateway 102.

In a particular embodiment, the residential gateway 102 may send the payment information 130 to the authorization server 104. The authorization server 104 may modify the subscriber database 170 to indicate that the set-top box device 110 is authorized to receive the media content 122 at the location 118. The authorization server 104 may send the authorization data 132 to the residential gateway 102. The authorization data 132 may indicate that the set-top box device 110 is authorized to receive the media content 122 at the location 118. In a particular embodiment, the residential gateway 102 may send the authorization data 132 to the set-top box device 110. The set-top box device 110 may store the authorization data 132 at the set-top box device 110. The set-top box device 110 may receive the media content 122 via the wireless transmission 124 from the residential gateway 102 after the set-top box device 110 sends the payment information 130 to the residential gateway 102.

Thus, the positioning data 120 can be used by the set-top box device 110 to determine whether the set-top box device 110 is authorized to receive the media content 122 at the location 118. The system 100 may be used to enable a provider of the media content 122 to prevent the set-top box device 110 from receiving the media content 122 when the set-top box device 110 is not authorized to receive the media content 122 at the location 118. In addition, the provider of the media content 122 can present the offer 128 to enable an unauthorized user to purchase an authorization to receive the media content 122 at the location 118.

Figure 2:
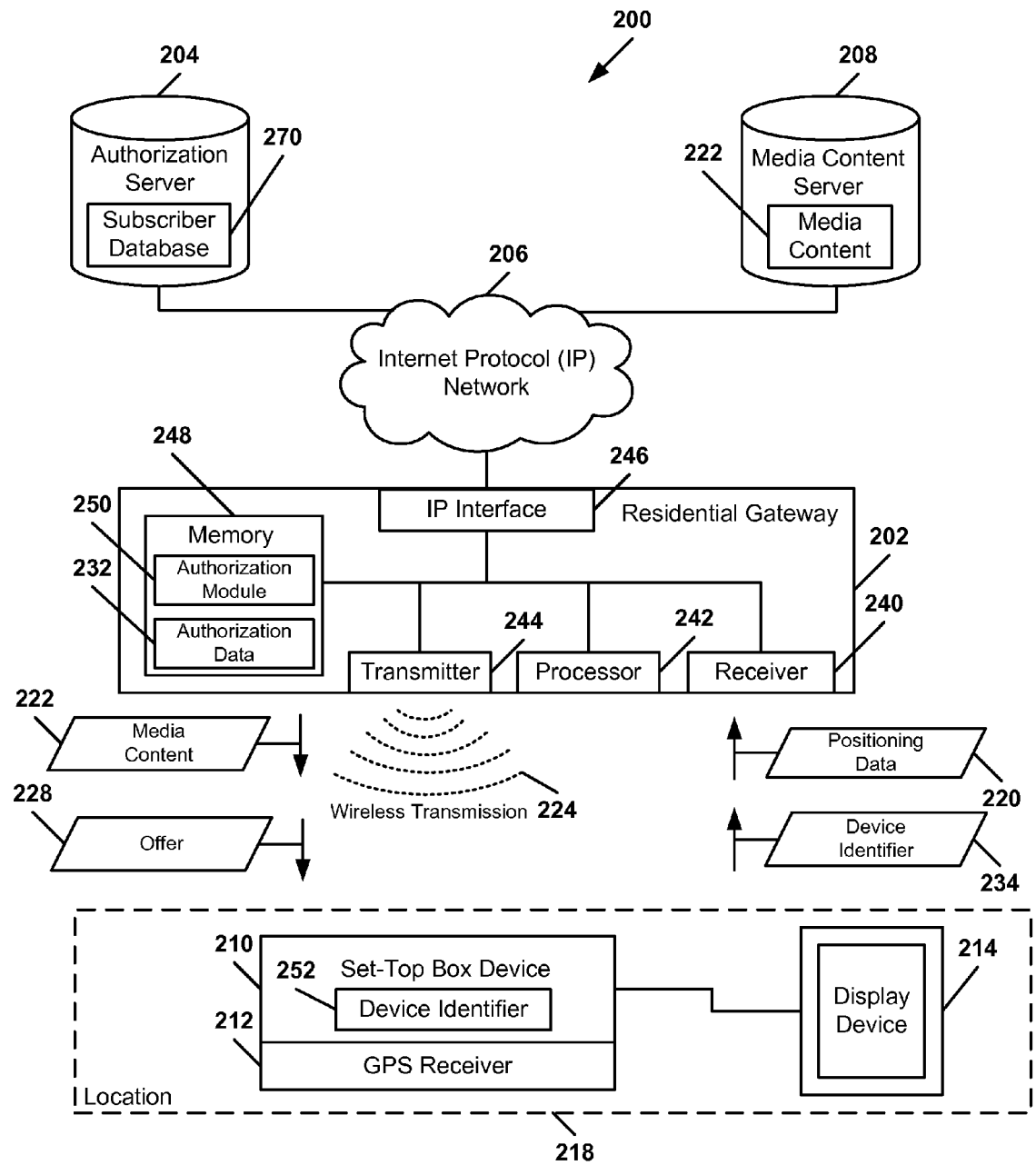
FIG. 2 is a block diagram of a second particular embodiment of a system to determine an authorization of a wireless set-top box device to receive media content.

Referring to FIG. 2, a block diagram of a second particular embodiment of a system to determine an authorization of a wireless set-top box device to receive media content is depicted and generally designated 200. The system 200 includes a residential gateway 202, an authorization server 204, and a media content server 208 coupled to an Internet Protocol (IP) network 206. The residential gateway 202 may communicate with a set-top box device 210 via a wireless transmission 224.

The media content server 208 may store media content 222 and send the media content 222 to the residential gateway 202 via the IP network 206. The media content 222 may include audio content, video content, video-on-demand content, other media content, or any combination thereof. For example, the video content may include television program content, movie content, video-on-demand content, and pay-per-view content.

The residential gateway includes a receiver 240, a processor 242, a transmitter 244, an Internet Protocol (IP) interface 246, and a memory 248. The memory 248 includes an authorization module 250. The residential gateway 202 may receive the media content 222 from the media content server 208 via the IP network 206. The receiver 240 may receive various data, such as positioning data 220, from the set-top box device 210. The processor 242 may execute operational instructions, such as the authorization module 250, stored at the memory 248 to perform various functions of the residential gateway 202.

The transmitter 244 may transmit data, such as the media content 222, to the set-top box device 210 via the wireless transmission 224. The IP interface 246 may transmit and receive data packets, such as the media content 222, via the IP network 206. The authorization module 250 may determine whether the set-top box device 210 is authorized to receive a portion of the media content 222 at a location 218. For example, the authorization module 250 may receive the positioning data 220 identifying the location 218 of the set-top box device 210. The authorization module 250 may compare the positioning data 220 to authorization data 232 stored at the memory 248 to determine whether the set-top box device 210 is authorized to receive a potion of the media content 222 at the location 218. The authorization data 232 may identify particular portions of the media content that the set-top box device 210 may receive at the location 218. For example, the authorization data 232 may indicate whether the set-top box device 210 is authorized to receive a set of basic media content, a portion of premium media content, other media content or any combination thereof. The authorization module 250 may instruct the transmitter 244 to transmit the media content 222 to the set-top box device 210 when the set-top box device 210 is authorized to receive the media content 222 at the location 218. The authorization module 250 may instruct the transmitter 244 to prevent the set-top box device 210 from receiving the media content 222 when the set-top box device 210 is not authorized to receive the media content 222 at the location 218.

The set-top box device 210 may receive the media content 222 from the residential gateway 202 via the wireless transmission 224 when the set-top box device 210 is authorized to receive the media content 222 at the location 218. The set-top box device 210 may send the received media content 222 to a display device 214 that is coupled to the set-top box device. A Global Positioning System (GPS) receiver 212 may be coupled to the set-top box device to provide the positioning data 220 associated with the set-top box device 210. In a particular embodiment, the GPS receiver 212 may be integrated with the set-top box device 210. The positioning data 220 may enable the residential gateway 202 to determine the location 218 of the set-top box device 210. A device identifier 234 that uniquely identifies the set-top box device 210 from other devices may be stored at the set-top box device 210. For example, the device identifier 234 may be a Media Access Control (MAC) address of the set-top box device 210.

In operation, the receiver 240 may receive the device identifier 234 and the positioning data 220 from the set-top box device 210. The authorization module 250 may determine which portions of the media content 222 the set-top box device 210 is authorized to receive at the location 218 based on the device identifier 234 and based on the positioning data 220. The authorization module 250 may instruct the transmitter 244 to transmit particular portions of the media content 222 to the set-top box device 210 when the set-top box device 210 is authorized to receive the particular portions of the media content 222 at the location 218. The authorization module 250 may instruct the transmitter 244 to prevent transmission of the media content 222 to the set-top box device 210 when the set-top box device 210 is not authorized to receive the media content 222 at the location 218. In a particular embodiment, the transmitter 244 may prevent transmission of the media content 222 to the set-top box device 210 by instructing the set-top box device 210 to disable reception of the media content 222. In another particular embodiment, the transmitter 244 may prevent transmission of the media content 222 to the set-top box device 210 by addressing the wireless transmission 224 to addresses (e.g. device identifiers) associated with authorized devices. To illustrate, the wireless transmission 224 may include a device identifier of an authorized device and exclude device identifiers of unauthorized devices. When the set-top box device 210 is not authorized to receive the media content 222, the residential gateway 202 may exclude the device identifier 252 from the wireless transmission 224. The set-top box device 210 may prevent the media content 222 from being displayed at the display device 214 because the wireless transmission 224 does not include the device identifier 252. In yet another particular embodiment, the transmitter 244 may prevent transmission of the media content 222 to the set-top box device 210 by encrypting the wireless transmission 224 using a key that is known to authorized devices but not known by unauthorized devices.

The authorization module 250 may transmit to the set-top box device 210 an offer 228 to purchase authorization to access the media content 222 at the location 218. The offer 228 may include an offer of a time-limited trial period in which the set-top box device 210 is enabled to receive at least a portion of the media content 222. For example, the offer 228 may enable the set-top box device 210 to receive a particular set of programming channels for a specific period of time, such as one week, after which the trial expires.

Thus, the residential gateway 202 may use the positioning data 220 and the device identifier 252 from the set-top box device 210 to determine whether the set-top box device 210 is authorized to receive the media content 222 at the location 218. The residential gateway 202 may prevent the set-top box device 210 from receiving the media content 222 when the set-top box device 210 is not authorized to receive the media content 222 at the location 218. In addition, a provider of the media content 222 may present the offer 228 to enable an unauthorized user to purchase an authorization to receive the media content 222 at the location 218.

Figure 3:
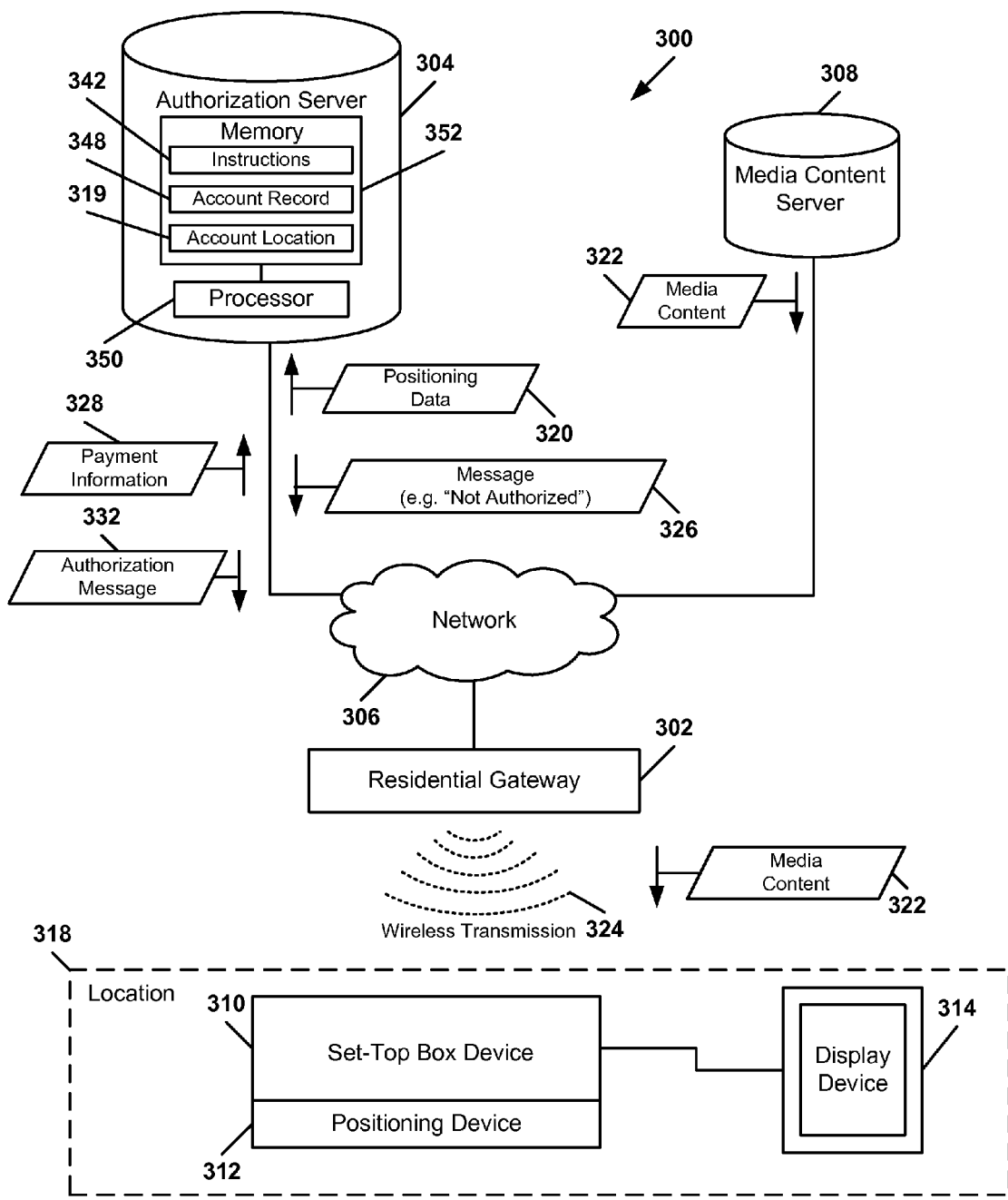
FIG. 3 is a block diagram of a third particular embodiment of a system to determine an authorization of a wireless set-top box device to receive media content.

Referring to FIG. 3, a block diagram of a third particular embodiment of a system to determine an authorization of a wireless set-top box device to receive media content is depicted and generally designated 300. The system 300 includes a residential gateway 302, an authorization server 304, and a media content server 308 coupled to a network 306. The residential gateway may communicate with a set-top box device 310 via a wireless transmission 324.

The media content server 308 may store media content 322 and send the media content 322 to the residential gateway 302 via the network 306. The media content 322 may include audio content, video content, video-on-demand content, other media content, or any combination thereof. For example, the video content may include television program content, movie content, video-on-demand content, and pay-per-view content.

The residential gateway 302 may receive the media content 322 from the media content server 308 via the network 306. In a particular embodiment, the network 306 is an Internet Protocol Television (IPTV) network. The residential gateway 302 may transmit the media content 322 to the set-top box device 310 via the wireless transmission 324 when the set-top box device 310 is authorized to receive the media content 322 at a location 318 of the set-top box device 310. For example, the wireless transmission 324 may use a wireless protocol, such as an 802.11 wireless protocol, a High Definition Multimedia Interface (HDMI) wireless protocol, a High Definition (HD) wireless protocol, another wireless protocol, or any combination thereof. The residential gateway 302 may receive positioning data 320 from the set-top box device 310 and send the positioning data 320 to the authorization server 304 to determine whether the set-top box device 310 is authorized to receive the media content 322 at the location 318.

The authorization server 104 includes a processor 350 and a memory 352. The memory 352 includes instructions 342, and an account record 348. The account record 348 may include account information associated with a particular subscriber, such as an account location 319. The instructions 342 may be executable by the processor 350 to determine whether the set-top box device 310 is authorized to receive the media content 322 at the location 318. The authorization server 304 may determine whether the set-top box device 310 is authorized to receive the media content 322 at the location 318 using the account record 348 and the account location 319.

The authorization server 304 may instruct the residential gateway 302 to transmit the media content 322 via the wireless transmission 324 when the set-top box device 310 is authorized to receive the media content 322 at the location 318. The authorization server 304 may instruct the residential gateway 302 to prevent transmission of the media content 322 when the set-top box device 310 is not authorized to receive the media content 322 at the location 318.

The set-top box device 310 may send the received media content 322 to a display device 314 that is coupled to the set-top box device 310. A positioning device 312 is coupled to the set-top box device 310 to provide the positioning data 320 associated with the set-top box device 310. In a particular embodiment, the positioning device 312 is a Global Positioning System (GPS) device. The positioning data 320 may enable the authorization server 304 to determine whether the location 318 of the set-top box device 310 is approximately the same as the account location 319 associated with the account record 348.

In operation, the positioning data 320 may be sent from the positioning device 312 to the authorization server 304 via the residential gateway 302. The positioning device 312 may be a Global Positioning System (GPS) receiver or other type of positioning device that is capable if providing the position data 320. The positioning data 320 may identify the location 318 of the set-top box device 310. The authorization server 304 may determine whether the set-top box device 310 is authorized to receive at least a portion of the media content 322 at the location 318. For example, the authorization server 304 may determine whether the set-top box device 310 is authorized to receive the media content 322 at the location 318 by determining whether the location 318 identified by the positioning data 320 is approximately the same as the account location 319 associated with the account record 348. The authorization server 304 may determine which particular portions of the media content 322 the set-top box device 310 is authorized to receive at the location 318 based on the account record 348. The authorization server 304 may instruct the residential gateway 302 to transmit the media content 322 to the set-top box device 310 when the location 318 is approximately the same as the account location 319.

The authorization server 304 may instruct the residential gateway 302 to prevent transmission of the media content 322 to the set-top box device 310 when the location 318 is not approximately the same as the account location 319. The authorization server 304 may send a message 326 to the set-top box device 310 for display at the display device 314. The message 326 may indicate that the set-top box device 310 is not authorized to receive the media content 322 at the location 318. The message 326 may provide information regarding an offer to purchase an authorization to receive the media content 322 at the location 318. When a user indicates a desire to accept the offer, the set-top box device 310 may send payment information 328 to the authorization server 304. The authorization server 304 may receive the payment information 328 to purchase the authorization to receive the media content 322 at the location 318. In response, the authorization server 304 may create or modify the account record 352 to indicate that the set-top box 310 is authorized to receive the media content 322 at the location 318. The authorization server 304 may send an authorization message 332 to the residential gateway 302 authorizing the residential gateway 302 to send the media content 322 to the set-top box device 310 via the wireless transmission 324.

Thus, the authorization server 304 may use the positioning data 320 to determine whether the set-top box device 310 is authorized to receive the media content 322 at the location 318. By doing so, a provider of the media content 322 can prevent the set-top box device 310 from receiving the media content 322 when the set-top box device 310 is not authorized to receive the media content 322 at the location 318. In addition, the provider of the media content 322 can receive the payment information 328 and enable an unauthorized user to purchase an authorization to receive the media content 322 at the location 318.

Figure 4:
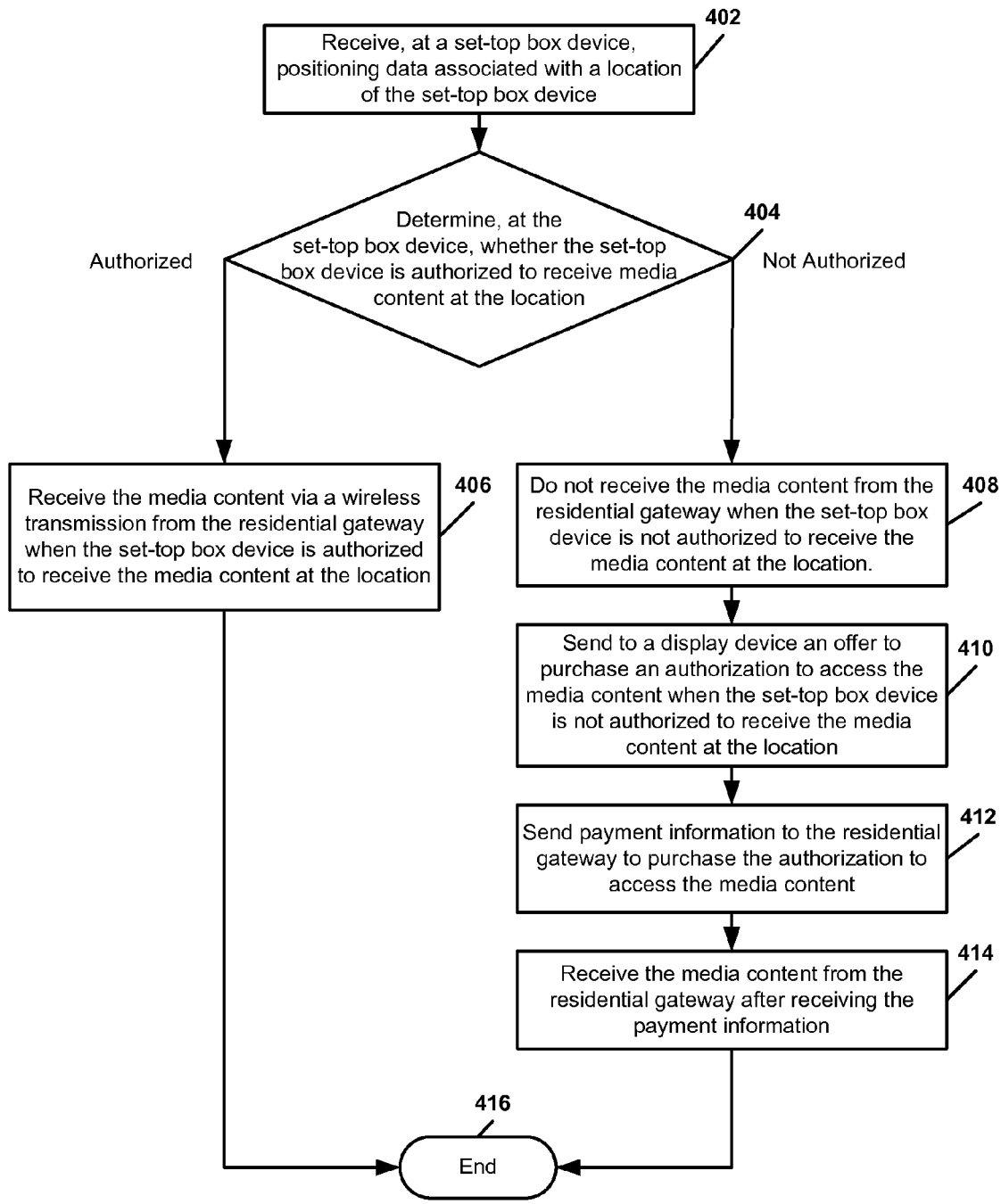
FIG. 4 is a flow diagram of a first particular embodiment of a method to determine an authorization of a wireless set-top box device to receive media content.

FIG. 4 is a flow diagram of a first particular embodiment of a method to determine an authorization of a wireless set-top box device to receive media content. The method may be performed by the set-top box device 110 of FIG. 1, the set-top box device 210 of FIG. 2, or the set-top box device 310 of FIG. 3.

Positioning data associated with a location of a set-top box device is received at a set-top box device, at 402. Moving to 404, a determination is made whether the set-top box device is authorized to receive media content at the location. For example, in FIG. 1, the set-top box device 110 may receive the positioning data 120 and determine whether the set-top box device 110 is authorized to receive the media content 122. When the set-top box device is authorized to receive the media content at the location, the media content is received via a wireless transmission from the residential gateway, at 406. For example, in FIG. 1, the set-top box device 110 may receive the media content 122 from the residential gateway 102 when the set-top box device 110 is authorized to receive the media content 122 at the location 118. When the set-top box device is not authorized to receive the media content at the location, the media content is not received from the residential gateway, at 408. Advancing to 410, an offer to purchase an authorization to access the media content is sent to a display device when the set-top box device is not authorized to receive the media content at the location. Continuing to 412, payment information may be sent to the residential gateway to purchase the authorization to access the media content. Moving to 414, the media content may be received from the residential gateway after receiving the payment information. For example, in FIG. 1, the set-top box device 110 may display the message 126 and the offer 128 at the display device 114. The set-top box device 110 may send the payment information 130 to the residential gateway 102. In response, the residential gateway 102 may send the media content 122 to the set-top box device 110 for display at the display device 114. The method ends at 416.

Thus, a set-top box device may receive positioning data to determine whether the set-top box device is authorized to receive media content at a particular location of the set-top box device. The set-top box device may receive the media content when the set-top box device is authorized to receive the media content at the particular location. The set-top box device may receive and display an offer to purchase an authorization to receive the media content when the set-top box device is not authorized to receive the media content at the particular location. In this way, a provider of the media content can prevent an unauthorized set-top box device from receiving the media content.

Figure 5:
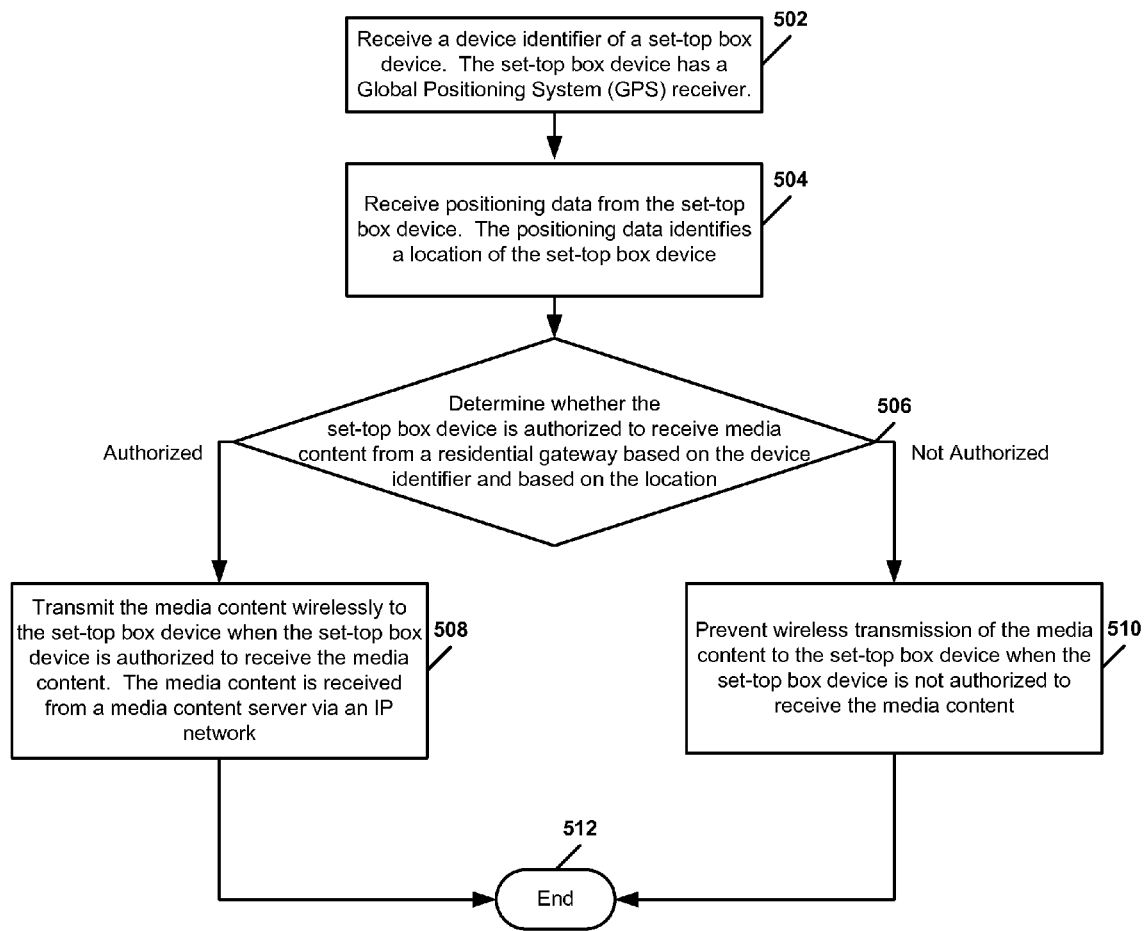
FIG. 5 is a flow diagram of a second particular embodiment of a method to determine an authorization of a wireless set-top box device to receive media content.

FIG. 5 is a flow diagram of a second particular embodiment of a method to determine an authorization of a wireless set-top box device to receive media content. The method may be performed by the residential gateway 102 of FIG. 1, the set-top box device 210 of FIG. 2, or the set-top box device 310 of FIG. 3.

A device identifier of a set-top box device is received, at 502. The set-top box device has a Global Positioning System (GPS) receiver. Moving to 504, positioning data is received from the set-top box device. The positioning data identifies a location of the set-top box device. Continuing to 506, a determination is made whether the set-top box device is authorized to receive media content from a residential gateway based on the device identifier and based on the location. For example, in FIG. 2, the residential gateway 202 may determine whether the set-top box device 210 is authorized to receive the media content 222 at the location 218 based on the positioning data 220 and the device identifier 234. When the set-top box device is authorized to receive the media content, the media content is wirelessly transmitted to the set-top box device, at 508. For example, in FIG. 2, the authorization module 250 may instruct the transmitter 244 to transmit the media content 222 to the set-top box device 210 after determining that the set-top box device 210 is authorized to receive the media content 222 at the location 218. The media content is received from a media content server via an IP network. When the set-top box device is not authorized to receive the media content, the media content is prevented from being wirelessly transmitted to the set-top box device, at 510. For example, in FIG. 2, the authorization module 250 may instruct the transmitter 244 to prevent transmission of the media content 222 to the set-top box device 210 after determining that the set-top box device 210 is not authorized to receive the media content 222 at the location 218. The method ends at 512.

Thus, a residential gateway may receive a device identifier and positioning data associated with a set-top box device to determine whether the set-top box device is authorized to receive media content at a particular location. The residential gateway may wirelessly transmit the media content to the set-top box device after the residential gateway determines that the set-top box device is authorized to receive the media content at the particular location. In this way, a provider of the media content can ensure that an unauthorized set-top box device does not receive the media content.

Figure 6:
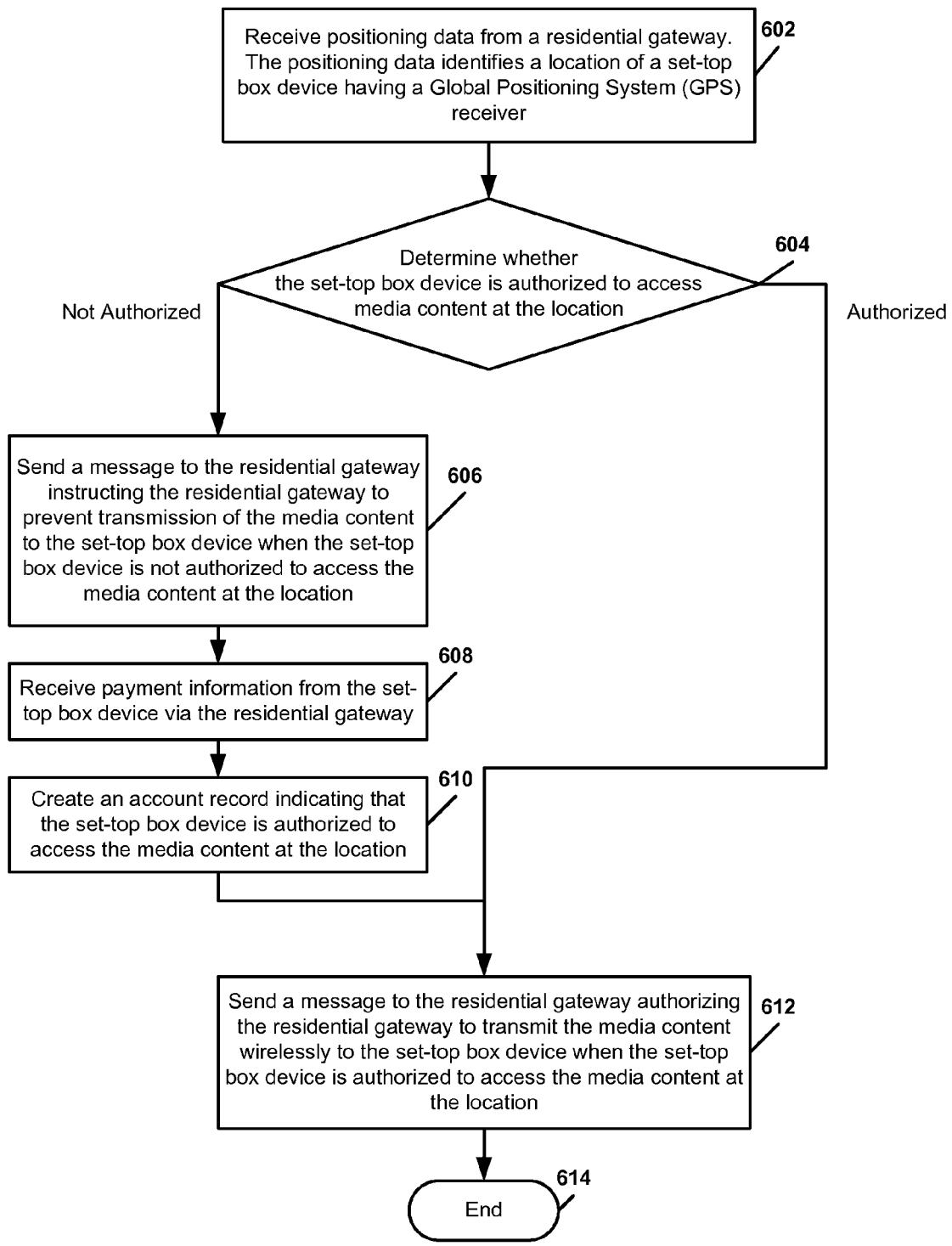
FIG. 6 is a flow diagram of a third particular embodiment of a method to determine an authorization of a wireless set-top box device to receive media content.

FIG. 6 is a flow diagram of a third particular embodiment of a method to determine an authorization of a wireless set-top box device to receive media content. The method may be performed by the authorization server 104 of FIG. 1, the authorization server 204 of FIG. 2, or the authorization server 304 of FIG. 3.

Positioning data from a residential gateway is received, at 602. The positioning data identifies a location of a set-top box device having a Global Positioning System (GPS) receiver. Moving to 604, a determination is made whether the set-top box device is authorized to access media content at the location. For example, in FIG. 3, the authorization server 304 may determine whether the set-top box device 310 is authorized to access the media content 322 at the location 318. When the set-top box device is not authorized to access the media content at the location, a message is sent to the residential gateway instructing the residential gateway to prevent transmission of the media content to the set-top box device, at 606. For example, in FIG. 3, the authorization server 304 may instruct the residential gateway 302 to prevent transmission of the media content 322 to the set-top box device 310 when the set-top box device 310 is not authorized to receive the media content 322 at the location 318. Proceeding to 608, payment information is received from the set-top box device via the residential gateway. Continuing to 610, an account record is created indicating that the set-top box device is authorized to access the media content at the location. When the set-top box device is authorized to access the media content at the location, a message is sent to the residential gateway authorizing the residential gateway to transmit the media content wirelessly to the set-top box device, at 612. For example, in FIG. 3, the authorization server 304 may instruct the residential gateway 302 to transmit the media content 322 to the set-top box device 310 when the set-top box device 310 is authorized to receive the media content 322 at the location 318. The method ends at 614.

Thus, an authorization server may determine whether an set-top box device is authorized to receive media content at a particular location and may instruct the residential gateway to present prevent transmission of the media content when the set-top box device is not authorized to access the media content at the location. In this way, a provider of the media content can ensure that an unauthorized set-top box device does not receive the media content.

Figure 7:
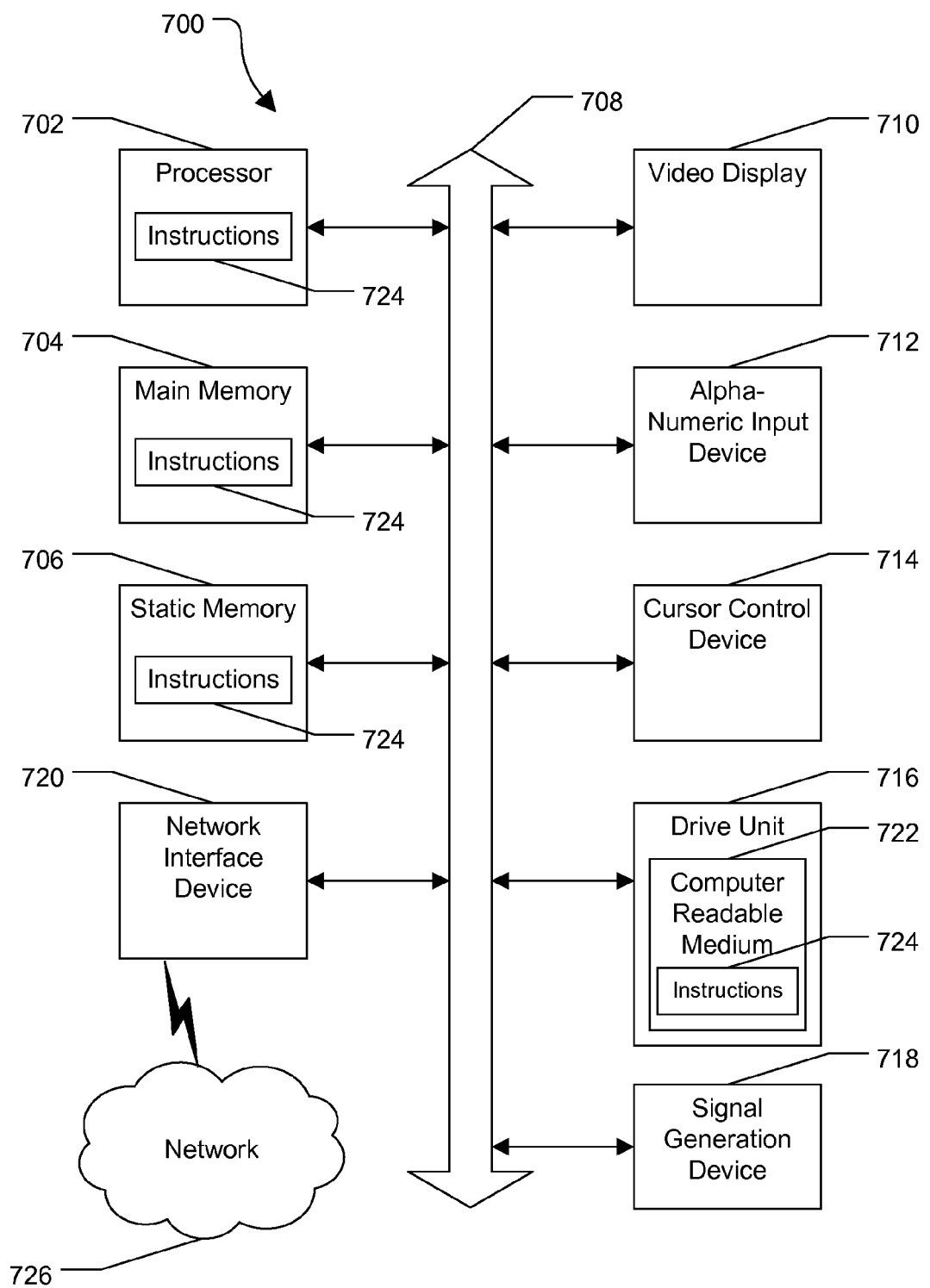
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system 700 may operate in the capacity of a set-top box device, a residential gateway, or a server, such as an authorization server or a media content server as discussed above with reference to FIG. 1-3. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid-state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, MPEG, SMPTE, H.264, HDMI, wireless HDMI, wireless HD, 802.11) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
receiving, at an end-user media playback device, positioning data associated with a location of the end-user media playback device, wherein the positioning data is received from a global positioning system receiver integrated into the end-user media playback device;
while reception of media content at the end-user media playback device from a residential gateway is disabled, making a determination, at the end-user media playback device, whether the end-user media playback device is authorized to receive the media content at the location;
when the determination indicates that the end-user media playback device is authorized to receive the media content at the location, enabling reception of the media content at the end-user media playback device via a wireless transmission from the residential gateway; and
when the determination indicates that the end-user media playback device is not authorized to receive the media content at the location:
sending, from the end-user media playback device to the residential gateway, a message indicating that the end-user media playback device is not authorized to receive the media content at the location; and
disabling reception of the media content from the residential gateway.

2. The method of claim 1, wherein the end-user media playback device comprises a set-top box device.

3. The method of claim 2, further comprising sending, from the set-top box device to a display device, a second message indicating that the set-top box device is not authorized to receive the media content at the location in response to the determination indicating that the set-top box device is not authorized to receive the media content at the location.

4. The method of claim 2, further comprising sending, from the set-top box device to a display device, an option to purchase an authorization to access the media content after the determination indicates that the set-top box device is not authorized to receive the media content at the location.

5. The method of claim 4, further comprising sending, from the set-top box device, payment information to the residential gateway to purchase the authorization to access the media content in response to a selection of the option to purchase the authorization to access by a user.

6. The method of claim 5, further comprising receiving, at the set-top box device, the media content from the residential gateway in response to sending the payment information.

7. A residential gateway comprising:
a receiver to wirelessly receive a device identifier of an end-user media playback device from the end-user media playback device and to wirelessly receive positioning data from the end-user media playback device, wherein the end-user media playback device receives the positioning data from a global positioning system receiver coupled to the end-user media playback device, and wherein the positioning data identifies a location of the end-user media playback device;
an authorization module configured to determine whether the end-user media playback device is authorized to receive media content from the residential gateway based on the device identifier and based on the positioning data; and
a transmitter configured to:
wirelessly transmit the media content wirelessly to the end-user media playback device in response to the authorization module determining that the end-user media playback device is authorized to receive the media content; and
disable transmission of the media content to the end-user media playback device in response to a message from the end-user media playback device indicating that the end-user media playback device is not authorized to receive the media content.

8. The residential gateway of claim 7, further comprising an internet protocol interface to receive the media content from a media content server via an internet protocol network.

9. The residential gateway of claim 7, wherein the media content is associated with a particular subscription type of a plurality of subscription types, and wherein the authorization module is configured to determine whether the end-user media playback device is authorized to receive media content further based on a subscription level associated with the end-user media playback device.

10. The residential gateway of claim 7, wherein the transmitter is further configured to transmit an offer to purchase an authorization to receive the media content to the end-user media playback device.

11. The residential gateway of claim 7, wherein the transmitter is configured to transmit the media content wirelessly via a wireless high definition multimedia interface protocol transmission.

12. The residential gateway of claim 7, wherein the transmitter is further configured to transmit the media content via an Institute of Electrical and Electronics Engineers 802.11 protocol transmission.

13. An authorization server comprising:
a processor; and
a computer-readable storage device comprising instructions that, when executed by the processor, cause the processor to perform operations including:
receiving positioning data sent from an end-user media playback device, wherein the positioning data is usable to identify a location of the end-user media playback device;
determining whether the end-user media playback device is authorized to access particular media content at the location based on a comparison of the positioning data to account location data; and
sending, to a residential gateway, a message to cause the end-user media playback device to disable reception of the particular media content by the end-user media playback device in response to a determination that the end-user media playback device is not authorized to access the particular media content at the location.

14. The authorization server of claim 13, wherein the operations further include:
receiving payment information from the end-user media playback device via the residential gateway; and
creating an account record indicating that the end-user media playback device is authorized to access the particular media content at the location.

15. The authorization server of claim 13, wherein the operations further include sending a second message to the residential gateway authorizing the residential gateway to transmit the particular media content wirelessly to the end-user media playback device in response to a determination that the end-user media playback device is authorized to access the particular media content at the location.

16. The authorization server of claim 13, wherein determining whether the end-user media playback device is authorized to access the particular media content at the location includes:
 identifying an account associated with the end-user media playback device; and
 comparing the location identified by the positioning data to the account location data.

17. The method of claim 2, wherein making the determination comprises comparing the positioning data to account location data stored at the set-top box device.

18. The residential gateway of claim 7, wherein the device identifier includes a media access control address.

19. The authorization server of claim 13, wherein the account location data is stored at the computer-readable storage device.

* * * * *